(12) United States Patent
Sahasrabudhe et al.

(10) Patent No.: US 9,958,057 B2
(45) Date of Patent: May 1, 2018

(54) GEAR BACKLASH CONTROL FOR AN OPPOSED-PISTON ENGINE

(71) Applicant: ACHATES POWER, INC., San Diego, CA (US)

(72) Inventors: Abhishek B. Sahasrabudhe, San Diego, CA (US); Sumanth Kashyap, San Diego, CA (US); John J. Koszewnik, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 12 days.

(21) Appl. No.: 15/176,818

(22) Filed: Jun. 8, 2016

(65) Prior Publication Data

US 2017/0356542 A1 Dec. 14, 2017

(51) Int. Cl.
*F16H 57/12* (2006.01)
*F02B 61/06* (2006.01)
(Continued)

(52) U.S. Cl.
CPC .............. *F16H 57/12* (2013.01); *F02B 61/06* (2013.01); *F02B 75/24* (2013.01); *F02B 75/28* (2013.01); *F16H 55/18* (2013.01); *F16H 57/0006* (2013.01); *F16H 57/0431* (2013.01); *F16H 2057/126* (2013.01)

(58) Field of Classification Search
CPC .................. F16H 57/12; F16H 57/0006; F16H 2057/126; F16H 57/0431; F16H 55/18; F16H 55/24; F16H 55/28
See application file for complete search history.

(56) References Cited

U.S. PATENT DOCUMENTS

| 4,072,064 A | 2/1978 | Lloyd et al. ................. 74/409 |
| 5,870,928 A | 2/1999 | Genter et al. ................. 74/440 |

(Continued)

FOREIGN PATENT DOCUMENTS

| DE | 38 03 427 A1 | 8/1989 |
| DE | 39 01 076 A1 | 8/1989 |

(Continued)

OTHER PUBLICATIONS

International Search Report and Written Opinion dated Jul. 21, 2017, for PCT application No. PCT/US2017/033493.

*Primary Examiner* — Jacob Amick
(74) *Attorney, Agent, or Firm* — Terrance A. Meador; Julie J. Muyco

(57) ABSTRACT

An opposed-piston engine includes a backlash reducing gear with at least a first and second gear that move relative to each other because of a hydraulic pressure applied within the gear. A backlash control system that includes the backlash reducing gear can dynamically adjust backlash between at least two gears in the gear train of the engine during operation of the engine instead of setting backlash prior to operation of the engine. A method for adjusting backlash in a two-stroke-cycle, opposed-piston engine with a backlash reducing gear includes providing hydraulic fluid, such as oil, to the gear, and allowing the backlash reducing gear to adapt to changes in the engine that include temperature changes, torque reversals, changes in load and the like. The backlash reducing gear adapts to changes in the engine by controlled leaking and intake of oil.

15 Claims, 9 Drawing Sheets

(51) Int. Cl.

| | |
|---|---|
| *F16H 57/00* | (2012.01) |
| *F16H 57/04* | (2010.01) |
| *F02B 75/24* | (2006.01) |
| *F02B 75/28* | (2006.01) |
| *F16H 55/18* | (2006.01) |

(56) References Cited

U.S. PATENT DOCUMENTS

| | | | |
|---|---|---|---|
| 5,979,259 A | 11/1999 | Shook et al. | 74/409 |
| 5,979,260 A | 11/1999 | Long et al. | 74/440 |
| 6,109,129 A | 8/2000 | Genter et al. | 74/440 |
| 6,247,377 B1 | 6/2001 | Long et al. | 74/440 |
| 6,293,166 B1 | 9/2001 | Genter et al. | 74/440 |
| 6,598,572 B2 | 7/2003 | Cecur et al. | 123/90.55 |
| 8,387,480 B2 | 3/2013 | Park | 74/409 |
| 8,789,499 B2 | 7/2014 | Alonso | 123/51 |
| 2004/0103737 A1* | 6/2004 | Ask | F16H 55/18 74/445 |
| 2004/0200302 A1* | 10/2004 | Kampichler | F16H 55/18 74/409 |
| 2012/0285422 A1* | 11/2012 | Exner | F02B 75/282 123/51 R |
| 2014/0299109 A1 | 10/2014 | Fuqua et al. | 123/51 R |
| 2015/0020627 A1 | 1/2015 | Palfai et al. | 74/421 |
| 2015/0020629 A1 | 1/2015 | Koszewnik et al. | 74/445 |
| 2015/0053031 A1* | 2/2015 | Willcox | F16H 1/20 74/409 |
| 2016/0033030 A1 | 2/2016 | Palfai | F16H 57/12 |

FOREIGN PATENT DOCUMENTS

| | | |
|---|---|---|
| WO | WO-2015/009858 A1 | 1/2015 |
| WO | WO-2016/022417 A1 | 2/2016 |

\* cited by examiner

GEAR BACKLASH CONTROL FOR AN OPPOSED-PISTON ENGINE

RELATED APPLICATIONS

This application contains subject matter related to the subject matter of the following pending U.S. patent applications: U.S. application Ser. No. 13/385,539, filed Feb. 23, 2012, and published as US 2012/0285422; U.S. application Ser. No. 13/858,943, filed Apr. 8, 2013, and published as US 2014/0299109; U.S. application Ser. No. 13/944,787, filed Jul. 17, 2013, and published as US 2015/0020627; U.S. application Ser. No. 14/074,618, filed Nov. 7, 2013, and published as US 2015/0020629; U.S. application Ser. No. 14/450,747, filed Aug. 4, 2014, and published as US 2016/0033030; and U.S. application Ser. No. 15/142,261, filed Apr. 29, 2016.

FIELD

The field is reduction of noise, vibration, and harshness (NVH) in an internal combustion engine. More specifically, the field encompasses reduction of gear noise and vibration in the gear train of an opposed-piston engine through control of gear lash.

BACKGROUND

Gear vibration and clash in an internal combustion engine can lead to intense whining, sharp impulse noise (e.g., rattle), or both. These noises can cause extreme operator and passenger discomfort in a vehicle. Engine whine and rattle also add to the constant cacophony that can make proximity to transportation routes unpleasant. Because of this, performance standards and environmental regulations relating to vehicles increasingly include NVH limits.

Backlash is a gap (e.g., lash) typically present in meshing gears to account for manufacturing tolerances, to prevent binding of gears at higher operating temperatures, and to account for other variations in gears that can exist during operation of an engine. In gear trains of opposed-piston engines, during torque reversals, the driving gear makes contact with both flanks of the corresponding driven gear in a mesh, thereby producing gear rattle, especially when there is excessive backlash in the system.

The gear train of an opposed-piston engine with dual crankshafts inherently experiences events where contact is lost between teeth of adjacent gears in a mesh that produce rattle and vibration. For example, in the case where a phase difference is provided between the crankshafts (i.e., crank lead) in order to differentiate port opening and closing times, the gear train is subjected to a torque reversal event at least once every cycle of engine operation. Even without an inter-crankshaft phase difference, momentary inter-gear torque reversals can result from any of idler bounce, gear rotational distortion, shaft rotational distortion, or a combination thereof. Torque reversals result in gear train rattle when gear backlash is present.

Backlash control in an opposed-piston engine can be a balance between noise control, minimization of friction loss, and the efficient transfer of torque in the gear train. Conventional backlash controls include methods and apparatus that fix the backlash of an engine prior to operation of the engine (e.g., movement of idler gears, the use of select fit gears), or perhaps additionally after operation and alteration of an engine, but dynamic backlash control is not a feature of these conventional controls. Scissor gears of the conventional type, such as described in U.S. Pat. No. 5,979,259, are pre-tensioned with one or more torsional springs to take up the lash in a gear mesh between the scissor gear and an adjacent gear.

SUMMARY

A system and method for dynamic, hydraulic control of backlash in an opposed-piston engine with one or more crankshafts are provided in the implementations described below. The amount of backlash between two or more adjacent gears in a gear train can be adjusted dynamically and automatically during operation of the engine.

Provided in some implementations is a hydraulic backlash control system for use with an opposed-piston engine that includes a source of a hydraulic fluid (e.g., gas, liquid, oil, coolant, compressed gas, and the like) and a split or scissor gear that rotates a first part of the gear relative to a second part of the gear, to reduce gear backlash, primarily due to hydraulic forces. The opposed-piston engine can be a two-stroke-cycle, internal combustion engine having at least one cylinder with longitudinally-separated exhaust and intake ports and a pair of pistons disposed in opposition to one another in a bore of the cylinder, each piston in the pair of pistons connected to a crankshaft, each crankshaft connected to a crank gear in a gear train, such that there is a first crank gear and a second crank gear in the gear train. The hydraulic backlash control system can include a backlash reducing gear that includes a first gear with gear teeth and a recess for receiving oil, a second gear with teeth and a protrusion for fitting and moving within the recess in the first gear, a gear post on which the first gear and the second gear are mounted in which the first gear and second gear are configured to rotate about the gear post, an oil groove formed between the first and second gear in which the oil groove is in fluid communication with the recess, an oil inlet in fluid communication with the oil groove and/or the recess, and a check valve in fluid communication with the oil inlet and the recess, in which the check valve is configured to maintain a static hydraulic pressure within the backlash reducing gear at a level that maintains minimal backlash between the backlash reducing gear and at least one adjacent gear in the gear train. The following features can be present in some embodiments of the hydraulic backlash control system in any reasonable combination.

In some implementations, the gear post can include a fluid connection to a source of pressurized oil. The gear can include two or more recesses for receiving oil and two or more protrusions for fitting and moving within the recesses. The oil groove can include a rut, cut, channel, trench, trough, canal, gouge, or the like in the second gear in some implementations of the backlash reducing gear.

In a related aspect, an opposed-piston engine with a split or scissor gear to reduce gear backlash that rotates a first part of the gear relative to a second part of the gear, primarily due to hydraulic forces, is provided in some of the implementations described herein.

In a further related aspect, a method of dynamic backlash control in the gear train of an opposed-piston engine with a split or scissor gear to reduce gear backlash that rotates a first part of the gear relative to a second part of the gear primarily due to hydraulic forces is provided in some implementations.

DETAILED DESCRIPTION OF THE PREFERRED EMBODIMENTS

A specialized gear, system, and method for dynamic control of backlash in an opposed-piston engine are described. Using a backlash reducing gear, the amount of backlash between at least two adjacent gears in a gear train can be adjusted dynamically, and at the same time noise and rattling resulting from loss of contact between the teeth of adjacent gears (due to, e.g., systemic torque reversals) can be dampened during operation of the engine. While the engine is operating, adjustments to the backlash between at least two adjacent gears can be continuous and in response to changes in the engine such as temperature or wear. The backlash reducing gear, system, and method described herein utilize a multi-part gear with at least two gears with teeth, like a scissor gear, but without relying on springs to move the gears apart. The multi-part gear is dynamically and continuously actuated using hydraulic forces.

Figure 1:
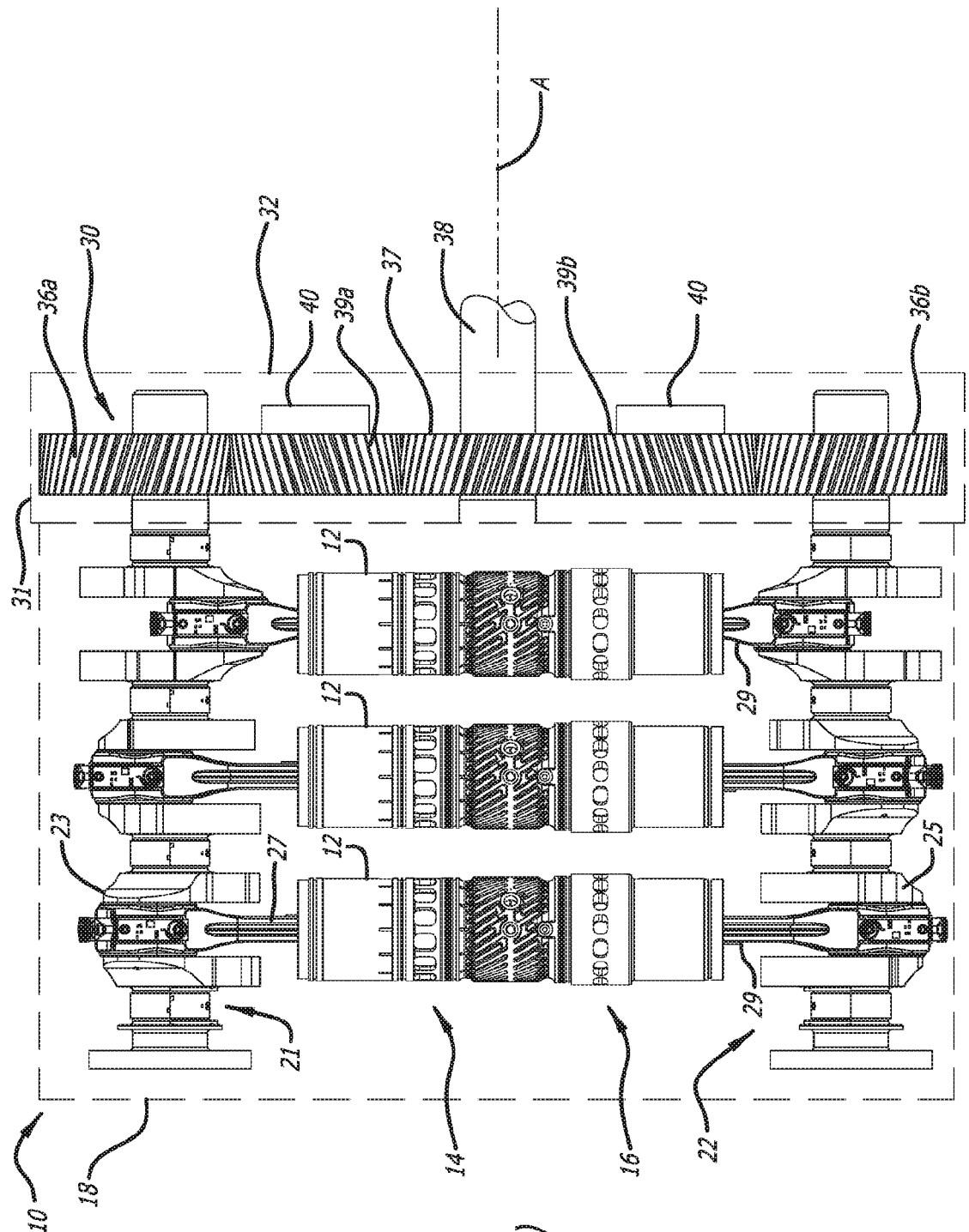
FIG. 1 is a side elevation view of an arrangement of cylinders, pistons, and a gear train in an opposed-piston engine.

FIG. 1 illustrates an arrangement of cylinders, pistons, and crankshafts in an opposed-piston engine with an associated gear train that can include a backlash reducing gear. The figure shows a three-cylinder arrangement, although this is not intended to be limiting; in fact, the basic architecture portrayed in FIG. 1 is applicable to opposed-piston engines with fewer, or more, cylinders. The opposed-piston engine 10 includes cylinders 12, each including exhaust and intake ports 14 and 16. Preferably, the cylinders comprise liners (also called "sleeves") that are fixedly mounted in tunnels formed in an engine frame or block 18. A pair of pistons (unseen in this figure) is disposed for opposing reciprocal movement in the bore of each cylinder 12. The opposed-piston engine 10 includes an interlinked crankshaft system comprising two rotatably-mounted crankshafts 21 and 22 and a crankshaft gear train 30 linking the crankshafts and coupling them to a power take-off shaft ("PTO shaft"). The crankshafts 21 and 22 are mounted to the engine by main bearing arrangements (not shown), one at the bottom of the engine block 18 and the other at the top. The crankshaft gear train 30 is supported in one end of the engine block 18 and is contained in a compartment 31 therein that is accessed through a removable cover 32.

As per FIG. 1, one piston of each piston pair is coupled to a respective crank journal 23 of the crankshaft 21 by a connecting rod assembly 27; the other piston is coupled to a respective crank journal 25 of the crankshaft 22 by a connecting rod assembly 29. The crankshafts 21 and 22 are disposed with their longitudinal axes in a spaced-apart, parallel arrangement. The crankshaft gear train 30 includes a plurality of gears, including two input gears 36a and 36b, which are fixed to respective ends of the crankshafts 21 and 22 for rotation therewith. An output gear 37 is mounted for rotation on a shaft or post. The output gear 37 drives a power take-off shaft 38 about an output axis of rotation A. In this configuration, two idler gears 39a and 39b are provided, each mounted for rotation on a fixed shaft or post 40. The idler gear 39a meshes with the input gear 36a and the output gear 37; the idler gear 39b meshes with the input gear 36b and the output gear 37. As a result of the configuration of the crankshaft gear train 30, the crankshafts 21 and 22 are co-rotating, that is to say, they rotate in the same direction. However, this is not meant to so limit the scope of this disclosure. In fact, a gear train construction according to this specification may have fewer, or more, gears, and may have counter-rotating crankshafts. Thus, although five gears are shown for the crankshaft gear train 30, the numbers and types of gears for any particular crankshaft gear train are dictated only by the engine design. For example, the crankshaft gear train 30 may comprise one idler gear for counter-rotation, or two idler gears (as shown) for co-rotation.

Figure 2:
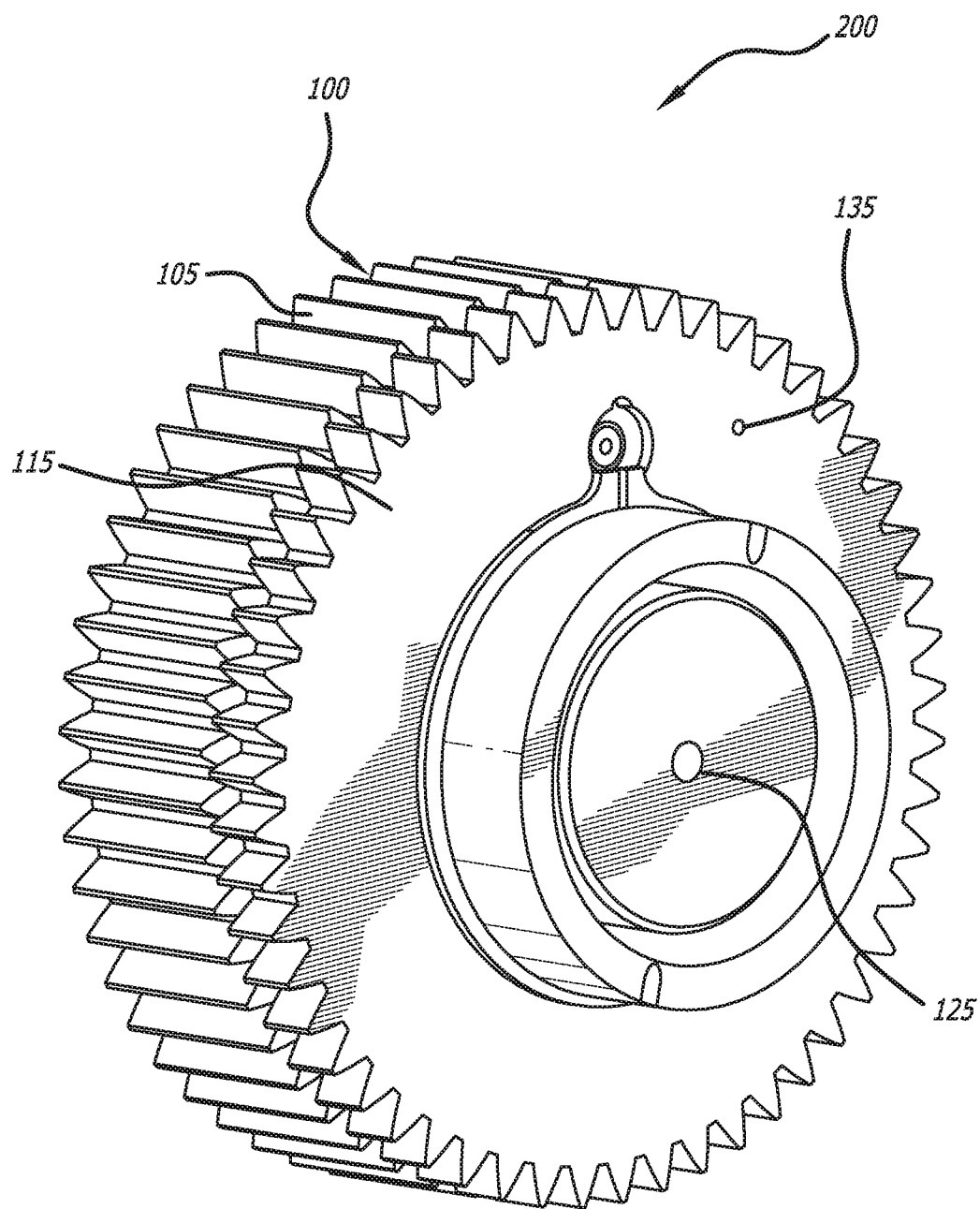
FIG. 2 shows a schematic of a gear for use with an opposed-piston engine.

FIG. 2 shows an exterior view 200 of a backlash reducing gear 100. The gear 100 is a composite gear made up of a first gear 105 and a second gear 115 which rotate around a gear post 125 on which the gear 100 is mounted, and which supports the gear on a gear block or gear train casing. On the face of the second gear 115, an oil outlet (e.g., an outlet hole or orifice) 135 is shown. The backlash reducing gear 100 can be similar to a scissor gear such that the first gear 105 and second gear 115 can rotate about the gear post 125 to create gear teeth of varying effective widths.

Figure 3A:
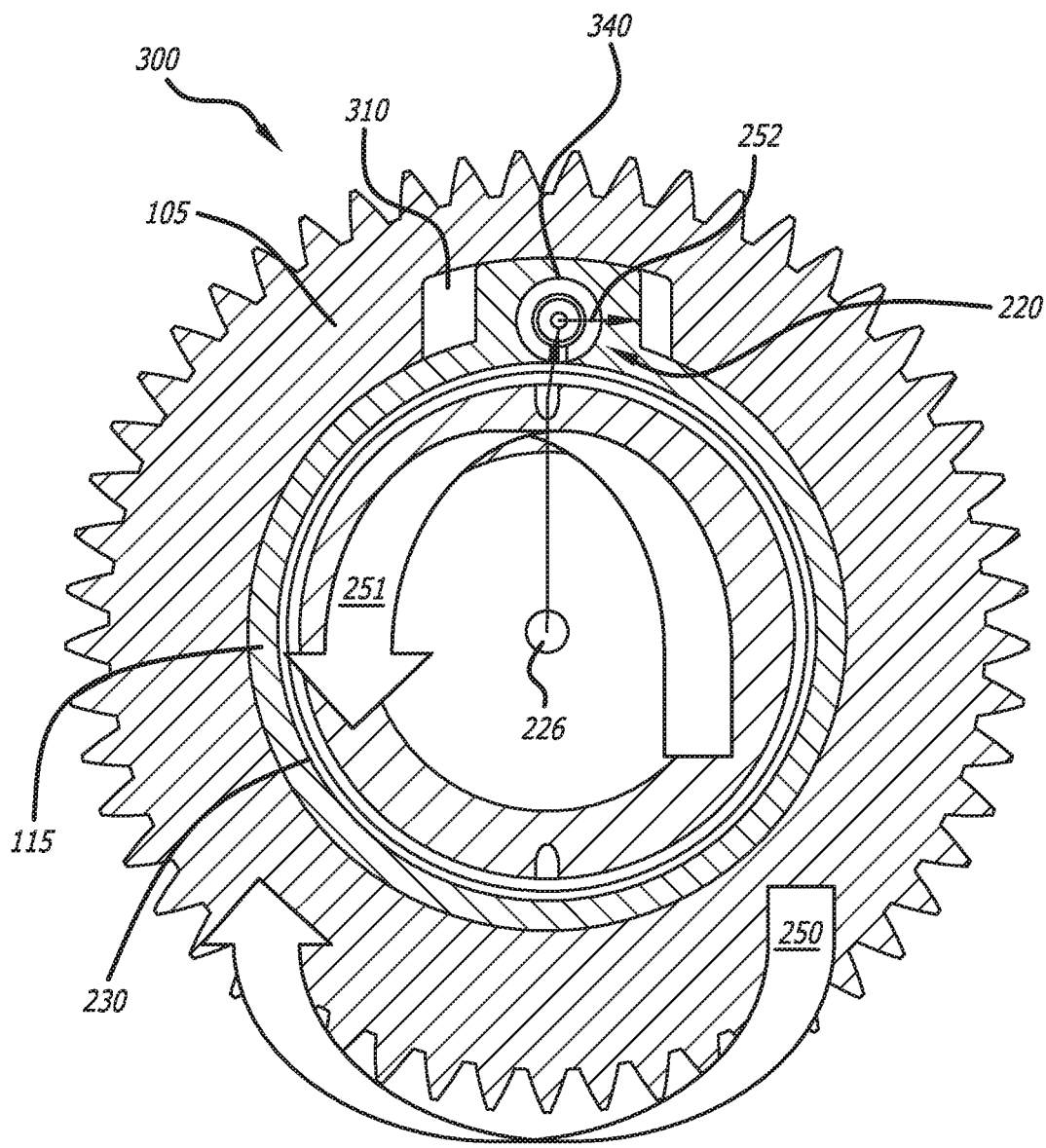
FIG. 3A shows a view of the interior of the gear shown in FIG. 2.
Figure 3B:
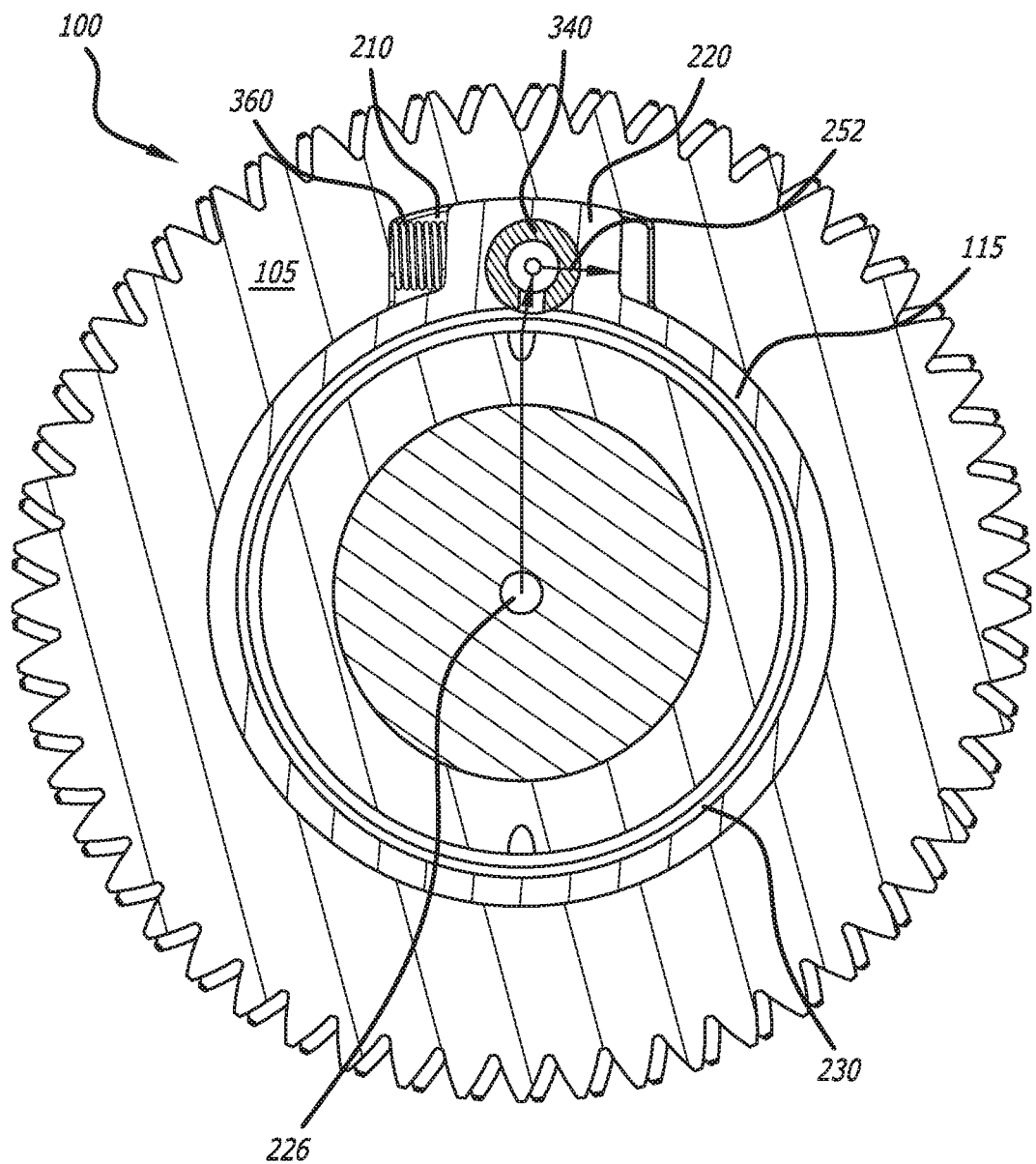
FIG. 3B shows a variation of the interior of the gear shown in FIG. 3A that includes a biasing linear spring.

FIG. 3A shows an interior view 300 of the backlash reducing gear 100 shown in FIG. 2. In FIG. 3A, the first gear 105 and part of the second gear 115 are shown. Also visible in the interior view 300 are: a check valve 340, an oil inlet in the gear post, a recess 210 in the first gear 105, a protrusion 220 in the second gear 115, an oil groove 230, as well as arrows 250, 251 that indicate the rotation of the first gear 105 and second gear 115 relative to each other and arrows 252 indicating the oil flow path. FIG. 3B shows an alternative embodiment of a backlash reducing gear 100 with a linear spring 360 in the recess 210 to bias the protrusion 220. The linear spring can help to reduce backlash on start-up of the engine, before hydraulic forces can cause the first and second gear of the backlash reducing gear to rotate. The force exerted by the linear spring will not cause excessive forces, such as would cause friction in the gear train. The backlash reducing gear 100 does not have a torsional spring within the gear, such as in the oil groove 230.

Figure 4:
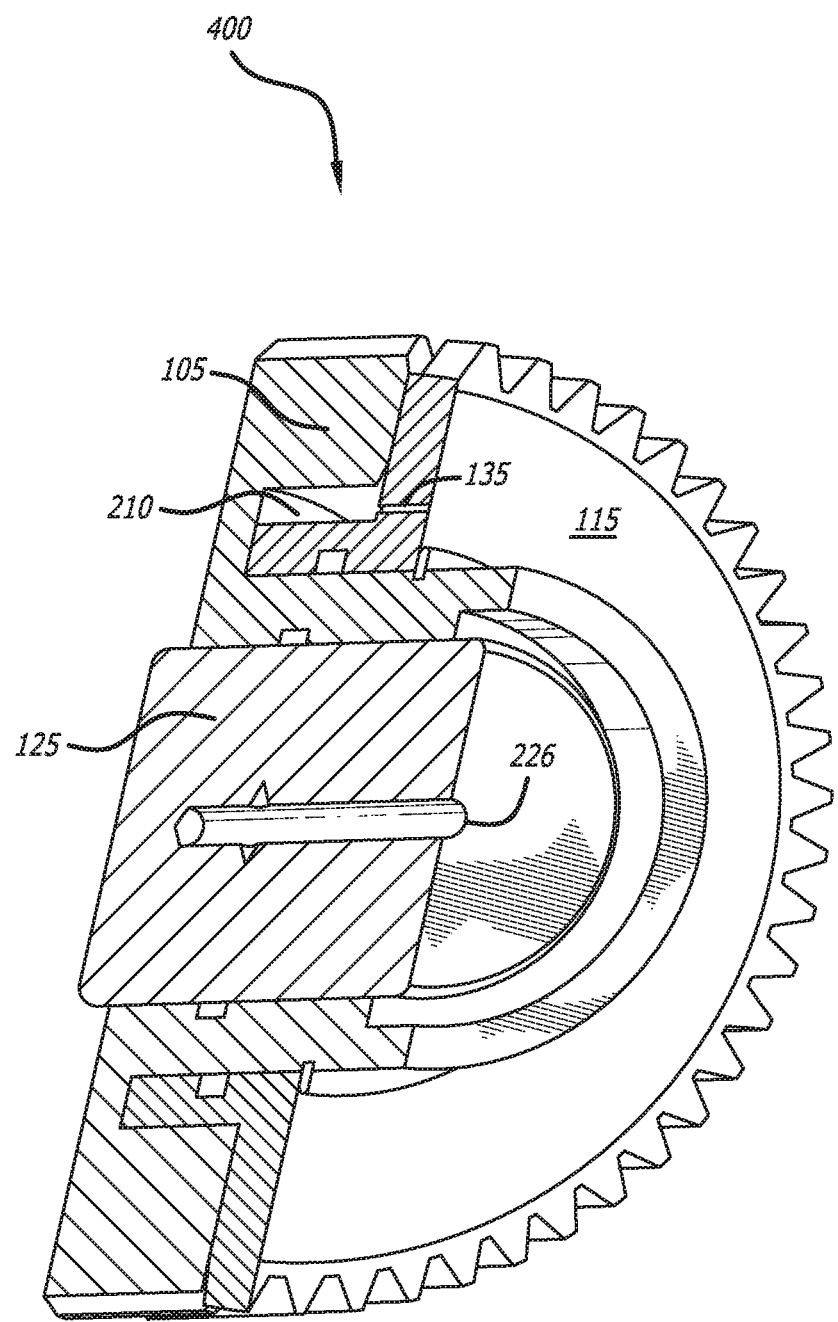
FIG. 4 shows a cross-sectional view of the gear shown in FIG. 2.

FIG. 4 is a cross-sectional view 400 of the backlash reducing gear 100 shown in FIG. 2 and FIG. 3A. In this view 400, the first gear 105 and second gear 115 are shown sliced through their center, cutting through the gear post 125 and oil inlet 226, as well. The recess 210 in the first gear 105, and the oil outlet 135 are also shown. From the view 300, the oil flow path 252 shown in FIG. 3A makes sense, as the oil inlet 226 can be seen progressing through much of the thickness of the gear post and the oil outlet 135 is shown as communicating between the recess 210 in the first gear and the exterior of the second gear 115.

The backlash reducing gear 100 shown in FIGS. 2, 3A, 3B, and 4 can operate in the following way. The first gear 105 and the second gear 115 each have teeth. When the backlash reducing gear 100 is in a neutral position, the effective tooth thickness (e.g., width of a gear tooth) can be equivalent to that of a tooth from the first gear or the second gear—whichever is wider. The gear is placed next to a mating gear. The teeth of the mating gear can be sufficiently far apart (e.g., have a sufficient circular pitch), so that the effective width of the gear teeth of the gear 100 needs to be increased. Oil under pressure is fed through the oil inlet 226 in the gear post 125 into the gear 100. The oil moves along the path 252 into the recess 210 in the first gear 105, pushing against the protrusion 220 in the second gear. The oil can also flow along the oil groove 230 so that hydraulic pressure is exerted on all sides of the protrusion 220. The oil groove 230 can be formed as a rut, cut, channel, trench, trough, canal, gouge, or the like in the first 105 or second 115 gear with the other gear (e.g., second or first gear) of the backlash reducing gear 100 forming a cover or enclosing the oil groove 230. Alternatively, the oil groove 230 can be formed from a rut, cut, channel, trench, trough, canal, gouge, or the like in the first gear 105 and a rut, cut, channel, trench, trough, canal, gouge, or the like in the second gear 115. The oil groove 230 can be machined, cast, etched, or otherwise formed in the first 105 and/or second 115 gear.

As the oil pushes against the protrusion 220, the second gear 115 rotates relative to the first gear 105 as indicated by the arrow 251 until the effective width of the gear tooth matches the spacing of the teeth of the mating gear. During a torque reversal event, as the spacing of the teeth of the mating gear reduces, the effective width of the teeth of the gear 100 will reduce, the outside of the teeth of the first 105 and second 115 gears move closer together, as indicated by the rotation suggested by the arrow 250. As this reduction in teeth width takes place, oil will be rejected out of the recess 210, through the oil outlet 135 (e.g., the controlled oil leak orifice), out of the gear 100.

Figure 5A:
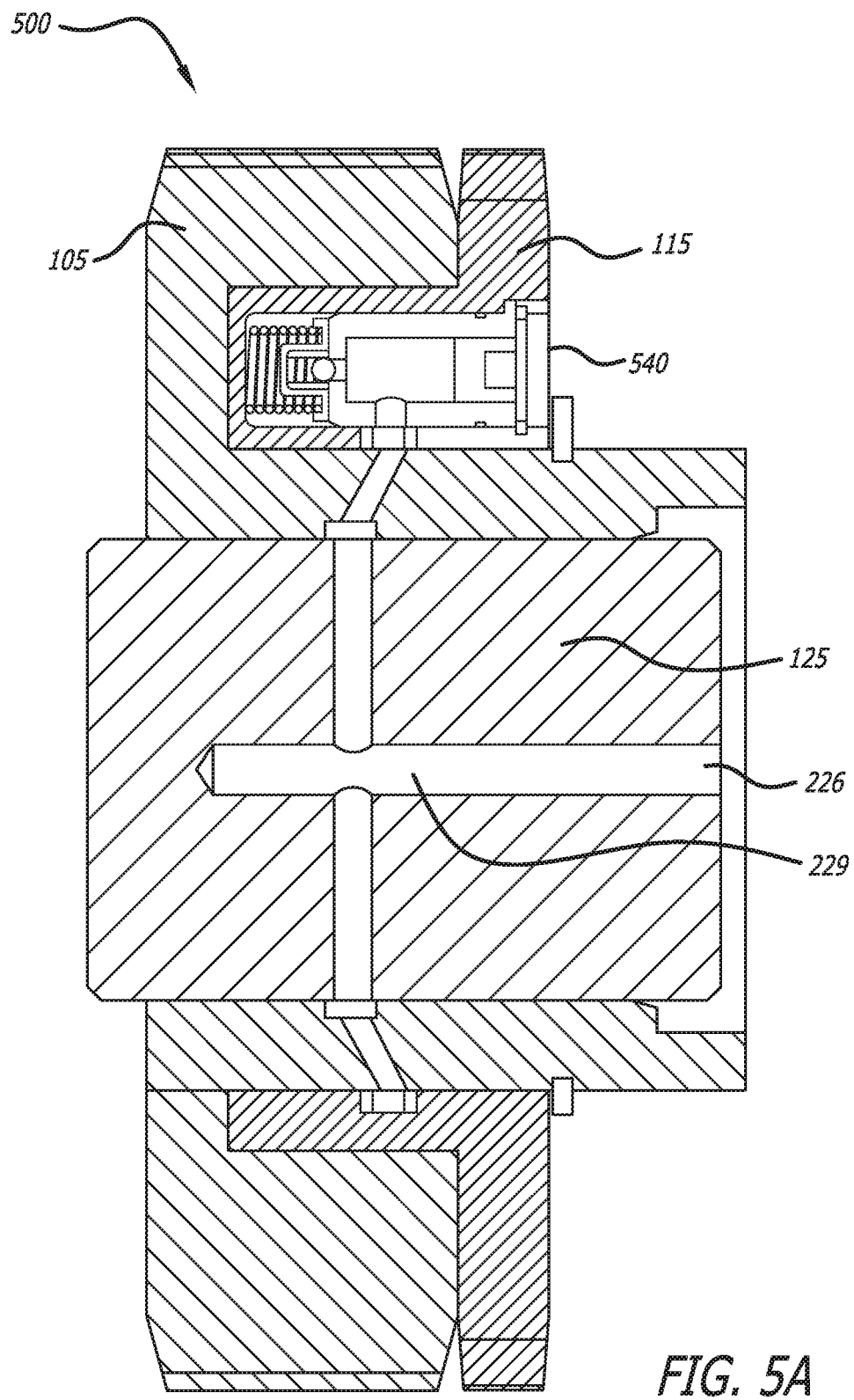
FIG. 5A shows an exemplary valve for use with the gear shown in FIG. 2.
Figure 5B:
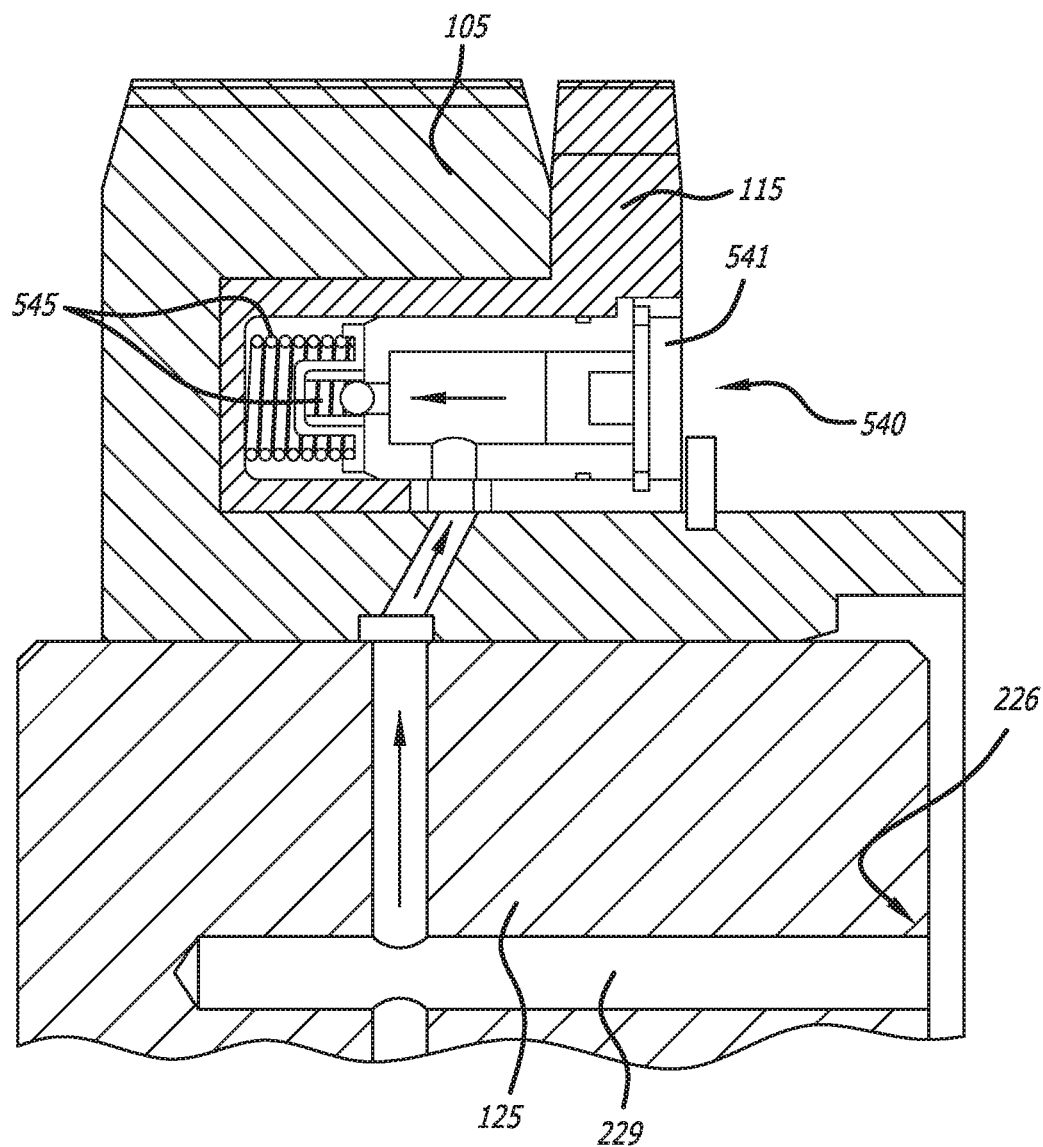
FIG. 5B shows this exemplary valve in greater detail.

FIG. 5A is a schematic of the gear showing the first gear 105, the second gear 115, the gear post 125, the oil inlet 226, the channel 229 that allows for oil to flow along the flow path 252 to the recess 210 in the first gear 105. During operation, as the effective thickness of the gear teeth reduces and then needs to increase again, oil in the gear moves up through the gear post 125, into the oil inlet 226 and channel 229, and into check valve 540 that is situated in the recess 210 in the first gear 105. The oil pressure in the gear can drop when the backlash reducing gear and mating gear lose contact, and oil can be admitted into the recess 210 and oil groove 230 through the check valve 540 instantaneously, and in this way reduce or eliminate the backlash in the gear mesh. FIG. 5B shows a closer view of the check valve 540. The check valve 540 includes a retainer ring 541 and a ball and spring pair 545. The retainer ring 541 allows for insertion of the check valve into the backlash reducing gear. The ball and spring pair 545 allows oil into the oil groove 230 and recess 210 when the oil pressure in those structures is less than the pressure exerted by the oil source, so long as the oil source is under enough pressure to overcome the biasing pressure exerted by the spring of the ball and spring pair 545.

In use, a gear train of an engine can have at least one backlash reducing gear adjacent to a mating gear, such as a crank gear, idler gear, or drive gear. Each backlash reducing gear receives pressurized oil from an oil source through an inlet in its gear post on which it is mounted. The pressurized oil can come from the same channel that feeds oil to the main bearings for the gear. Before the engine fires, pressurized oil can be applied to the backlash reducing gear with the help of a dedicated pump, solenoid, and the like. This application of pressurized oil before the engine starts can reduce backlash in the gear train, and in turn reduce noise in the engine during the entire time the engine is run, even during the start and stop of operation.

The pressurized oil travels from the inlet, through a channel, to a check valve in a recess in the backlash reducing gear. The check valve can be any type of check valve that allows for oil to flow from a source into the backlash reducing gear until backlash has been reduced or eliminated. In FIGS. 5A and 5B, the check valve shown has a ball and spring which move to limit the flow of oil across the valve. The spring can bias the ball towards closing the valve and can have an associated cracking pressure. When the oil supplied to the backlash reducing gear exceeds this cracking pressure, the ball shown in FIG. 5A and FIG. 5B moves, allowing oil into the gear. The oil pressurizes the interior of the backlash reducing gear, particularly the recess and oil groove. The first and second gears of the backlash reducing gear move relative each other so that the width of the effective gear tooth made by the first and second gear increases. This relative motion (i.e., rotation) continues until the backlash is completely taken up. The operation of the check valve in the backlash reducing gear is similar to that of a check valve in a hydraulic lash adjuster for a valve train, as described in U.S. Pat. No. 6,598,572. In a hydraulic lash adjuster, oil flows into a chamber of the check valve, and the oil can only escape the check valve slowly so that the lash adjuster stays in contact with a rocker arm in a valve train.

The teeth of the mating gear exert a reaction force on the teeth of the first and second gear of the backlash reducing gear. This force causes the pressure in the recess to increase. When the pressure in the recess exceeds the pressure from the oil supply, such as during a torque reversal event, the check valve closes instantly and oil leaks out through the controlled leak orifice. Though the figures show the backlash reducing gear as having only one recess and protrusion to move the first and second gears of the backlash reducing gear, each backlash reducing gear can have more than one recess and protrusion, such as two recesses and protrusions, three recesses and protrusions, four recesses and protrusions, or more. In such implementations of the backlash reducing gear with multiple recesses and protrusions, all of the recesses can be in the first gear and all of the protrusions can be in the second gear. Alternatively the first gear can have both one or more recess and one or more protrusion, and the second gear can have both one or more recess and one or more protrusions.

When the teeth of the mating gear come closer together, and in some cases the circular pitch reduces (e.g., because of the gears heating up), the teeth of the backlash reducing gear can also move so that the effective tooth thickness is smaller. Oil can leak out in a controlled manner when this happens. The oil leak can happen through the controlled leak oil orifice. This orifice can be sized to allow oil to leak at a finite rate, under specific oil levels or pressures within the backlash reducing gear. Alternatively, or additionally, a control system can alter the rate of oil leaked out of the gear or the pressure of the oil supplied. The rate of oil leaked out of the gear or the pressure of the oil supplied to the backlash reducing gear can be controlled by one or more dedicated pump, one or more valves, a diaphragm that controls the size of the oil leak orifice, or a combination thereof. Alternatively, in some implementations, the backlash reducing gear can be configured to maintain a preset pressure within the gear without having an oil leaking orifice.

The controlling means that set and change the pressure within the backlash reducing gear can actuate in response to the state of the engine, such as the speed of the engine, the load, and the like. Alternatively, or additionally, the controlling means (e.g., the pump, diaphragm, valve, etc.) can actuate to maintain a pre-set maximum pressure within the backlash reducing gear. A controller, for example an engine controlling unit, can cause the controlling means to actuate in addition to controlling other functions of the engine.

At times the backlash reducing gear experiences a drop in internal hydraulic pressure. This drop in internal hydraulic pressure can correspond to an increase in backlash between the backlash reducing gear and a mating gear. The check valve will automatically work to allow more oil from the oil supply to flow into the gear. In this way, the backlash in the gear train can be automatically adjusted (e.g., minimized) using hydraulics.

In the gear train of an engine, a backlash reducing gear as described herein can be placed adjacent to at least one other gear. The gear train can have three or more gears. For each pair of adjacent gears, at least one gear can be a backlash reducing gear to minimize backlash and allow the engine to better accommodate systematic torque reversals, reducing engine rattle. The fully hydraulic backlash reducing gear will be sufficiently stiff to impart the dampening properties to reduce engine rattle, as well as reduce backlash, but without the frictional losses caused by scissor gears pretensioned with springs.

A gear train, like the one shown in FIG. 1, may include one or more backlash reducing gears, such as the backlash reducing gears with a first and second gear, as described above. The number of backlash reducing gears in the gear train 30 can correspond to each pair of adjacent gears including at least one backlash reducing gear. In a gear train, one possible arrangement of gears would have a backlash reducing gear in a first position, at the outside of the train, as an input gear (e.g., 36a or 36b in FIG. 1). In a gear train with five gears, as shown in FIG. 1, the middle gear (e.g., output gear 37) and the other input gear would also be backlash reducing gears, though one of the idler gears (e.g., 39a or 39b in FIG. 1) could also be a backlash reducing gear in this configuration. When a backlash reducing gear as described above is adjacent to two gears with fixed teeth thickness and circular pitch, then the teeth of the backlash reducing gear can adjust to suit the mesh with the smallest amount of lash. The fact that a backlash reducing gear, as shown in FIGS. 2-5B, with two adjacent gears with different fixed gear teeth spacing can only accommodate one of the gears means that there will still be backlash in the gear train, but perhaps not as much as there would be using only conventional gears of fixed teeth spacing. To remove all of the backlash in a gear train, the number of backlash reducing gears with a first and second gear in the gear train needed corresponds to the number of gear meshes in the train. That is, for a gear train of n gears, n−1 backlash reducing gears with a first and second gear are needed to remove the entire backlash.

Figure 6:
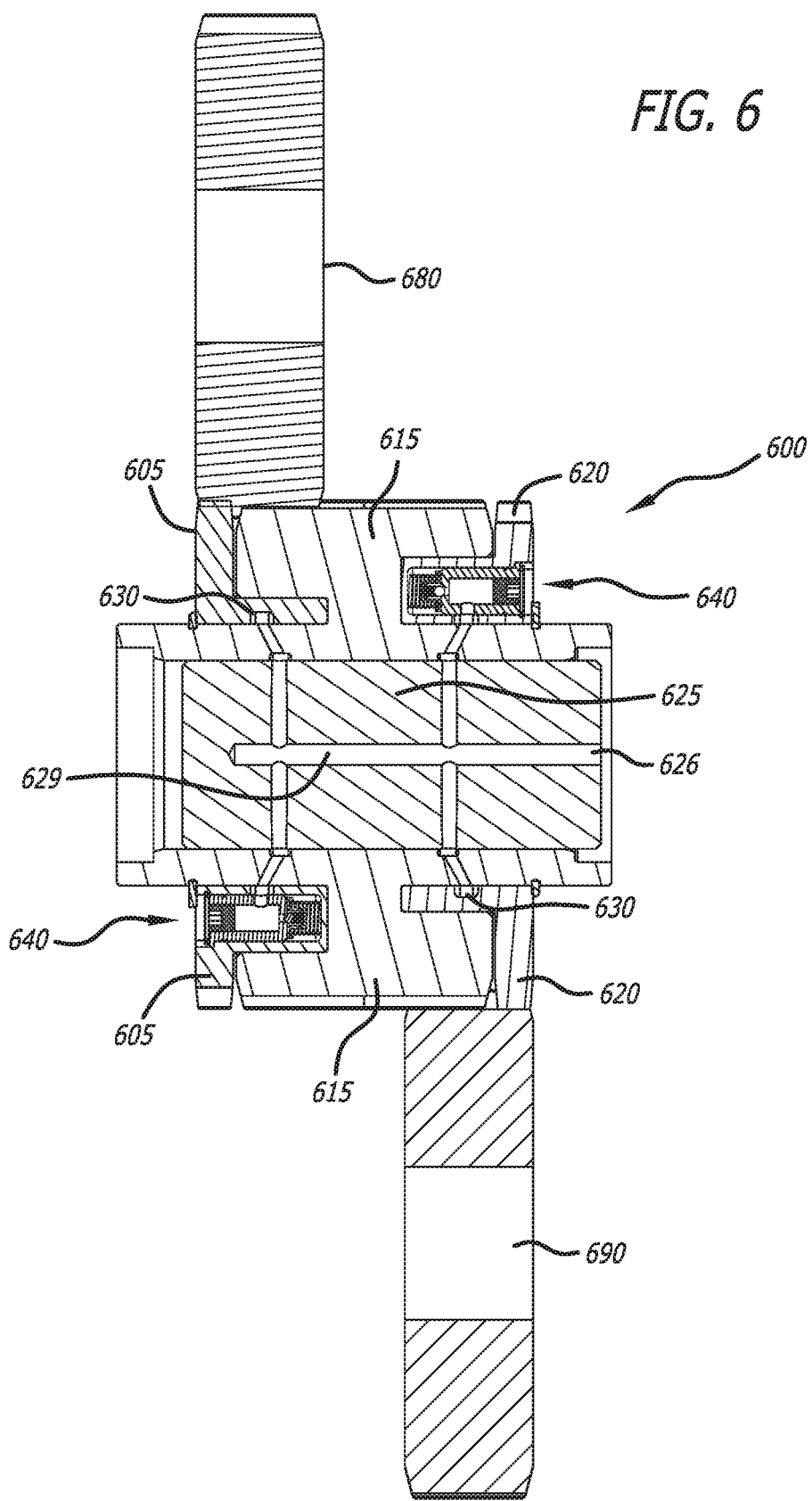
FIG. 6 shows a cross-section of a split or scissor gear made of three gears for backlash reduction in a gear train.

In some implementations, a backlash reducing gear 600 can have three gears, a first 605, second 615, and third 620 gear, as shown in FIG. 6. Such a backlash reducing gear 600 can accommodate two adjacent gears 680, 690 with fixed teeth spacing or fixed center distance. One configuration of such a backlash reducing gear 600 includes a first gear 605, a second gear 615, and a third gear 620, in which the first 605 and third 620 gears can independently rotate about the second gear 620 under hydraulic forces. The second gear 620 can have recesses on both sides, as shown in FIG. 6, for receiving protrusions from the first 605 and third 620 gears, and each recess receiving hydraulic fluid (e.g., gas, liquid, oil, coolant, compressed gas, and the like) from a gear post 625 through one or more channels 629 in the gear post and second gear, and a groove 630 in the first 605 or third 620 gear. Each recess can have a check valve 640 in the corresponding protrusion and a controlled oil leak orifice. The first 605 and second 615 gears can mesh with a first adjacent gear 680, while the second 615 and third 620 gears mesh with a second adjacent gear 690. The first gear 605 of the backlash reducing gear 600 can rotate relative to the second gear 615 until the lash between the first adjacent gear 680 and the effective teeth formed by the teeth of the first 605 and second 615 gear is eliminated. The third gear 620 of the backlash reducing gear 600 can rotate relative to the second gear 615 to eliminate the backlash between the second adjacent gear 690 and this portion of the backlash reducing gear 600. The rotation of the first 605 and third 620 gears can be effected by the inlet of fluid under pressure (e.g., oil), and the first 605 and third 620 gears can move, as described above with respect to a two-part backlash reducing gear.

A gear train of two or more gears (e.g., n gears) can have one or more backlash reducing gears, as described above. For example, a gear train of n gears, one gear can be a backlash reducing gear, n−1 gears can be backlash reducing gears, n−2 gears can be backlash reducing gears, up to n gears (i.e., all the gears in the train) can be backlash reducing gears. The backlash reducing gears in a gear train can be all gears of a first and second gear (e.g., the gear shown in FIGS. 2-5B) or all backlash reducing gears can be gears with a first, second, and third gear (e.g., the gear shown in FIG. 6). Alternatively, the backlash reducing gears in a gear train can be a combination of gears of a first and second gear and gears of a first, second, and third gear. In some implementations, in a gear train, a single gear post can attach to two or more gears, such as at least one backlash reducing gear and one conventional gear, or to two or more backlash reducing gears. A gear post attached to two or more gears can allow the gear train to accommodate gears of multiple sizes (e.g., gears of multiple diameter).

Figure 7:
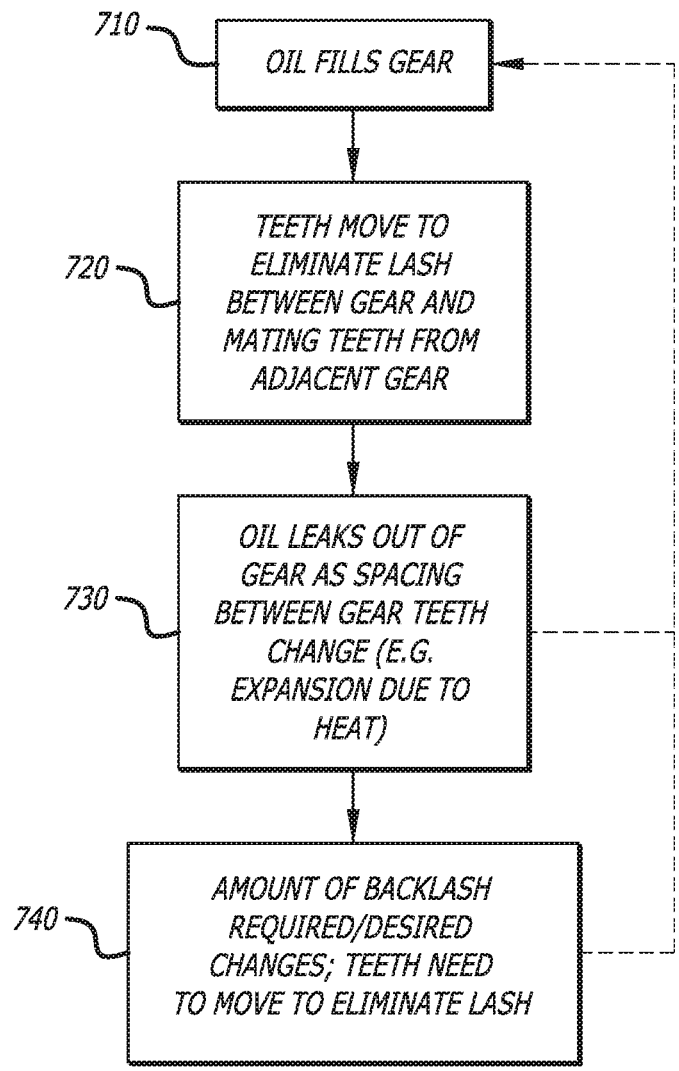
FIG. 7 shows a flow diagram of an exemplary method for dynamic adjustment of backlash according to some implementations.
Figure 3A:
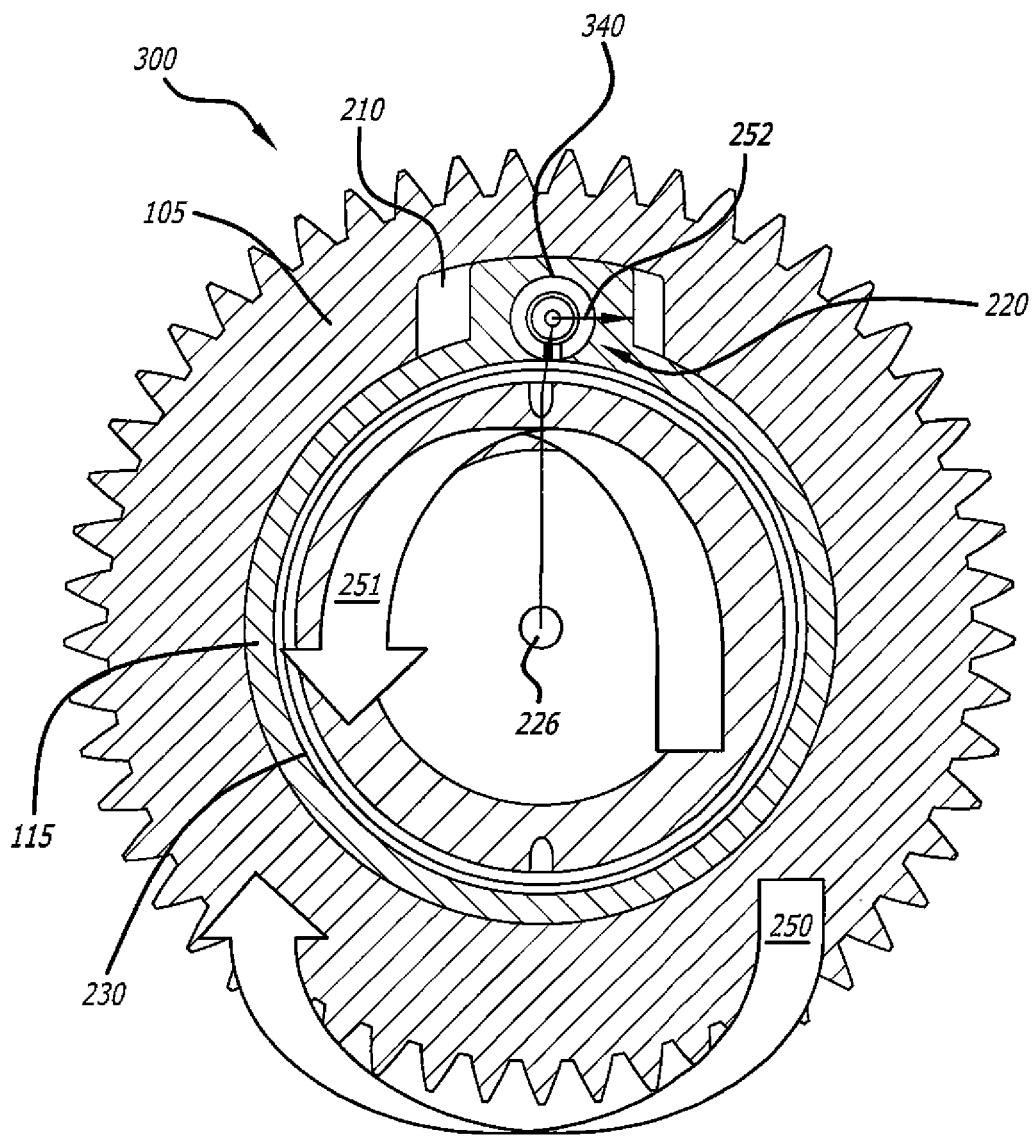
Figure 7:
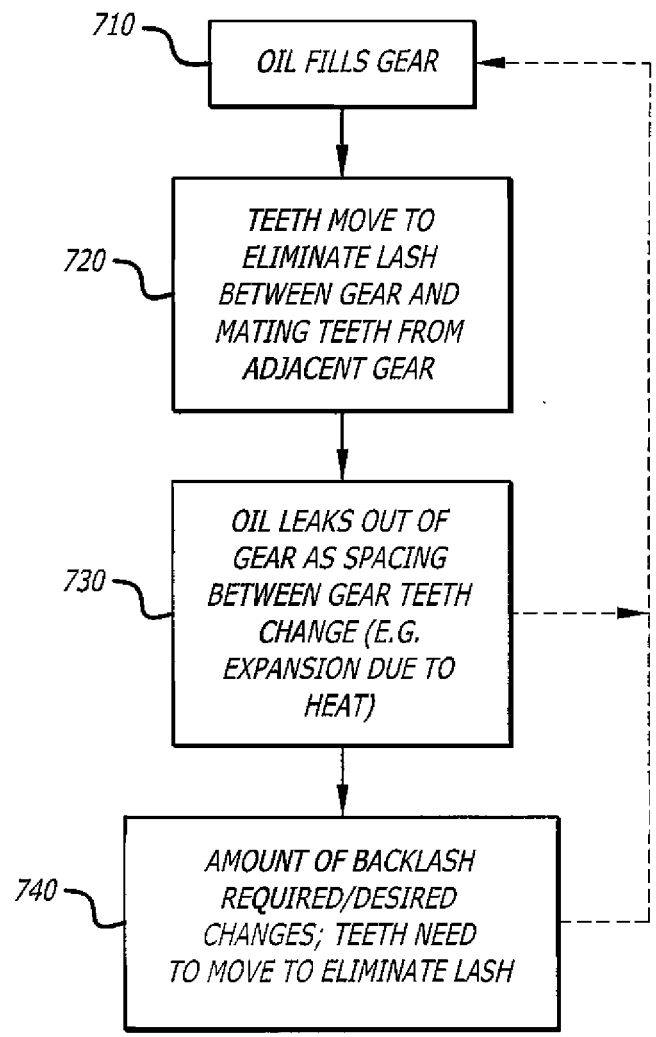

FIG. 7 shows a method of using a backlash reducing gear, such as those described above, to remove backlash between two adjacent gears in a gear train. The method starts with filling the backlash reducing gear with oil, as in 710. The backlash reducing gear is a multi-part gear, like a scissor gear, with at least a first gear and a second gear that can rotate relative to each other to allow the effective tooth thickness of the gear to grow as needed. As described above, the oil travels through the oil inlet in the gear post to the recess (or recesses) in the backlash reducing gear, through the oil groove, surrounding the protrusion or flange. Admitting oil into the backlash reducing gear causes the teeth to move, eliminating lash between the gear and mating teeth from an adjacent gear, as in 720. The oil pushes on the protrusion within the recess of the backlash reducing gear. Because the protrusion is fixedly attached to the second gear of the backlash reducing gear, the first and second gears move relative each other and, the effective width of the gear teeth is adjusted. After all of the lash between the gear and an adjacent gear is taken up, the backlash reducing gear can react to changes to the engine, such as reduction in the spacing between teeth, or change in circular pitch, in the adjacent gears due to increases in temperature, as in 730. When this happens, the first and second gears of the backlash reducing gear, as shown in FIG. 2-FIG. 5B, move relative to each other and oil leaks out of the leak orifice. The check valve ensures that an appropriate amount of static hydraulic pressure is maintained within the backlash reducing gear to have its teeth fully mated with those of at least one of its adjacent gears. When the amount of backlash increases, for example as the engine cools down, the first and second gear need to rotate to eliminate lash, as in 740. The static hydraulic pressure within the backlash reducing gear can increase to move the teeth of the first and second gear parts again. This process continues all during operation of the engine so lash and systematic torque reversals do not cause excessive gear rattle or high efficiency losses due to friction.

In addition to the ability of a backlash reducing gear to automatically and dynamically adjust to changing engine conditions, a backlash reducing system may include an oil providing system that can vary the pressure of oil supplied to one or more backlash reducing gears. A backlash reducing system may also, or alternately, include an oil leak control system to control the outflow of oil from one or more backlash reducing gears, thus regulating the pressure within those gears.

The scope of patent protection afforded the novel tools and methods described and illustrated herein may suitably comprise, consist of, or consist essentially of the elements a backlash reducing gear that includes a first gear and a second gear which move dynamically with respect to each other by primarily hydraulic means to create an effective tooth width that allow for the reduction or elimination of lash with at least one adjacent gear. Further, the novel tools and methods disclosed and illustrated herein may suitably be practiced in the absence of any element or step which is not specifically disclosed in the specification, illustrated in the drawings, and/or exemplified in the embodiments of this application. Moreover, although the invention has been described with reference to the presently preferred embodiment, it should be understood that various modifications can be made without departing from the spirit of the invention. Accordingly, the invention is limited only by the following claims.

The invention claimed is:

1. A backlash reducing gear adapted for use in an opposed-piston internal combustion engine having a gear train with an arrangement of gears coupling at least one crankshaft to an output drive, the backlash reducing gear comprising:
   a first gear with gear teeth and a recess for receiving oil;
   a second gear with teeth and a protrusion for fitting and moving within the recess in the first gear;
   a gear post on which the first gear and the second gear are mounted, the first gear and second gear configured to rotate about the gear post;
   an oil groove formed between the first and second gear, the oil groove in fluid communication with the recess;
   an oil inlet in fluid communication with a source of oil and the recess;
   an oil leak orifice in fluid communication with the oil groove and/or the recess; and
   a check valve in fluid communication with the oil inlet and the recess, the check valve configured to maintain a static hydraulic pressure within the backlash reducing gear at a level that maintains minimal backlash between the backlash reducing gear and at least one adjacent gear in the gear train,
   in which the oil inlet, oil groove, and recess form an oil flow path that is configured such that when the backlash reducing gear is in use, oil flows along the oil groove so that hydraulic pressure is exerted on all sides of the protrusion.

2. The backlash reducing gear of claim 1, wherein the gear post comprises a fluid connection to a source of pressurized oil.

3. The backlash reducing gear of claim 1, comprising two or more recesses for receiving oil and two or more protrusions for fitting and moving within the recesses.

4. The backlash reducing gear of claim 1, wherein the oil groove comprises a rut, cut, channel, trench, trough, canal, gouge, or the like in the first gear and/or a rut, cut, channel, trench, trough, canal, gouge, or the like in the second gear.

5. An opposed-piston internal combustion engine comprising:
   a gear train comprising an arrangement of gears coupling at least one crankshaft to an output drive;
   an oil providing system comprising an oil source; and
   a backlash reducing gear in the gear train, the backlash reducing gear comprising:
   a first gear with gear teeth and a recess for receiving oil;
   a second gear with teeth and a protrusion for fitting and moving within the recess in the first gear;
   a gear post on which the first gear and the second gear a mounted, the first gear and second gear configured to rotate about the gear post;
   an oil groove formed between the first and second gear, the oil groove in fluid communication with the recess;
   an oil inlet in fluid communication with a source of oil and the recess;
   an oil leak orifice in fluid communication with the oil groove and/or the recess; and
   a check valve in fluid communication with the oil inlet and the recess, the check valve configured to maintain a static hydraulic pressure within the backlash reducing gear at a level that maintains minimal backlash between the backlash reducing gear and at least one adjacent gear in the gear train,
   in which the oil inlet, oil groove, and recess form an oil flow path that is configured such that when the backlash reducing gear is in use, oil flows along the oil groove so that hydraulic pressure is exerted on all sides of the protrusion.

6. The opposed-piston internal combustion engine of claim 5, wherein the gear post comprises a fluid connection to a source of pressurized oil.

7. The opposed-piston internal combustion engine of claim 5, wherein the backlash reducing gear comprises two or more recesses for receiving oil and two or more protrusions for fitting and moving within the recesses.

8. The opposed-piston internal combustion engine of claim 5, wherein the oil groove comprises a rut, cut, channel, trench, trough, canal, gouge, or the like in the first gear and/or a rut, cut, channel, trench, trough, canal, gouge, or the like in the second gear.

9. The opposed-piston internal combustion engine of claim 5, wherein the gear train comprises two or more backlash reducing gears.

10. The opposed-piston internal combustion engine of claim 9, wherein the gear train includes at least one backlash reducing gear for each pair of adjacent gears in the gear train.

11. A method for dynamically adjusting backlash between two adjacent gears in a gear train of an opposed-piston internal combustion engine having at least one cylinder with longitudinally-separated exhaust and intake ports and a pair of pistons disposed in opposition to one another in a bore of the cylinder, each piston in the pair of pistons connected to a crankshaft, each crankshaft connected to a crank gear in the gear train, such that there is a backlash reducing gear, as in claim 1, adjacent to at least one mating gear in the gear train, the method comprising:
   providing oil to a recess in the backlash reducing gear;
   in response to hydraulic pressure exerted by the oil in the recess, rotating the first gear and the second gear of the backlash reducing gear relative to each other until rotation is limited by teeth of the at least one mating gear; and maintaining a static hydraulic pressure within the recess at a level that reduces backlash between the teeth of the backlash reducing gear and the at least one mating gear.

12. The backlash reducing gear of claim 2, wherein the oil groove comprises a rut, cut, channel, trench, trough, canal, gouge, or the like in the first gear and/or a rut, cut, channel, trench, trough, canal, gouge, or the like in the second gear.

13. The backlash reducing gear of claim 3, wherein the oil groove comprises a rut, cut, channel, trench, trough, canal, gouge, or the like in the first gear and/or a rut, cut, channel, trench, trough, canal, gouge, or the like in the second gear.

14. The opposed-piston internal combustion engine of claim 6, wherein the oil groove comprises a rut, cut, channel, trench, trough, canal, gouge, or the like in the first gear and/or a rut, cut, channel, trench, trough, canal, gouge, or the like in the second gear.

15. The opposed-piston internal combustion engine of claim 7, wherein the oil groove comprises a rut, cut, channel, trench, trough, canal, gouge, or the like in the first gear and/or a rut, cut, channel, trench, trough, canal, gouge, or the like in the second gear.

\* \* \* \* \*

UNITED STATES PATENT AND TRADEMARK OFFICE
CERTIFICATE OF CORRECTION

| | | |
|---|---|---|
| PATENT NO. | : 9,958,057 B2 | |
| APPLICATION NO. | : 15/176818 | |
| DATED | : May 1, 2018 | |
| INVENTOR(S) | : Sahasrabudhe et al. | |

It is certified that error appears in the above-identified patent and that said Letters Patent is hereby corrected as shown below:

In the Drawings

-- Replace Figure 3A with new Figure 3A marked "Replacement Sheet" attached hereto, so that reference numeral 310 is changed to 210

-- Replace Figure 7 with new Figure 7 marked "Replacement Sheet" attached hereto In the Specification -- Column 7, Line 60, delete "620" and replace with "615"

-- Column 7, Line 61, delete "620" and replace with "615"

Signed and Sealed this
Twenty-sixth Day of June, 2018

Andrei Iancu
*Director of the United States Patent and Trademark Office*